(12) United States Patent
Poeppelmeier et al.

(10) Patent No.: US 7,790,317 B1
(45) Date of Patent: Sep. 7, 2010

(54) SILVER VANADIUM OXIDE-FLUORIDE MATERIAL USEFUL AS A BATTERY CATHODE

(75) Inventors: Kenneth R. Poeppelmeier, Evanston, IL (US); Heather K. Izumi, Chicago, IL (US); Erin M. Sorensen, Chicago, IL (US); John T. Vaughey, Elmhurst, IL (US)

(73) Assignee: Northwestern University, Evanston, IL (US)

( * ) Notice: Subject to any disclaimer, the term of this patent is extended or adjusted under 35 U.S.C. 154(b) by 1320 days.

(21) Appl. No.: 11/211,135

(22) Filed: Aug. 24, 2005

Related U.S. Application Data

(60) Provisional application No. 60/606,475, filed on Sep. 1, 2004.

(51) Int. Cl.
H01M 4/34 (2006.01)
H01M 4/54 (2006.01)
H01M 4/58 (2010.01)
H01M 10/32 (2006.01)

(52) U.S. Cl. ............... 429/219; 429/231.5; 429/231.95; 423/23

(58) Field of Classification Search ................ 429/219
See application file for complete search history.

(56) References Cited

U.S. PATENT DOCUMENTS

| 4,310,609 A | 1/1982 | Liang et al. ........... 429/330 |
| 4,391,729 A | 7/1983 | Liang et al. ........... 252/182.1 |
| 4,964,877 A | 10/1990 | Keister et al. .......... 29/623.1 |
| 5,221,453 A | 6/1993 | Crespi et al. ............ 204/291 |
| 6,650,942 B2 * | 11/2003 | Howard et al. ............ 607/34 |
| 2002/0090548 A1 * | 7/2002 | Gan et al. .............. 429/128 |

OTHER PUBLICATIONS

Heier et al., [pyH]2[Cu(py)4(MX6)2] (MX6= ZrF62-, NbOF52-, MoO2F42-; py= pyridine): Rarely Observed Ordering of Metal Oxide Anions, 1998, American Chemical Society, 37, 76-80.*
Takeuchi, E.S.;Quattrini, P.J.; Greatbatch, W., "Lithium/Silver Vanadium Oxide Batteries for Implantable Defibrillators", Pace, 1988, 11, pp. 2035-2039.
Brodd, R.J.; Bullock, K.R.; Leising, R.A.; Middaugh, R.L.; Miller, J.R.; Takeuchi, E.S., "Batteries, 1977 to 2002", J. Electrochem. Soc., 2004, 151, K1-K11.
Crespi, A.M.; Skarstad, P.M.; Zandbergen, H.W., "Characterization of silver vanadium oxide cathode material by high-resolution electron microscopy", J.Power Sources, 1995, 54, pp. 68-71.
Crespi, A.M.; Somdahl, S.K.; Schmidt, C.L.; Skarstad, P.M., "Evolution of power sources for implantable cardioverter defibrillators", J. Power Sources, 2001, 96, pp. 33-38.
Garcia-Alvarado, F.; Tarascon, J.M., "Lithium intercalation in $Ag_2V_4O_{11}$", Solid State Ionics, 1994, 73, pp. 247-254.
Leising, R.A.; Takeuchi, E.S., "Solid-State Cathode Materials for Lithium Batteries: Effect of Synthesis Temperature on the Physical and Electrochemical Properties of Silver Vanadium Oxide", Chem. Mater., 1993, 5, pp. 738-742.

(Continued)

Primary Examiner—Robert Hodge
Assistant Examiner—Sean P Cullen

(57) ABSTRACT

Metal oxide-fluoride material including silver, vanadium, oxygen and fluorine, such as $Ag_4V_2O_6F_2$, is made and useful as a cathode for a battery. The material is made by subjecting silver oxide, vanadium oxide, and aqueous solution of HF to superambient temperature in a pressure vessel.

17 Claims, 2 Drawing Sheets

OTHER PUBLICATIONS

Leising, R.A.; Takeuchi, E.S., "Solid-State Synthesis and Characterization of Silver Vanadium Oxide for Use as a Cathode Material for Lithium Batteries", Chem. Mater., 1994, 6, pp. 489-495.

Leising, R.A.; Thiebolt, W.C.; Takeuchi, E.S., "Solid-State Characterization of Reduced Silver Vanadium Oxide from the Li/SVO Discharge Reaction", Inorg. Chem., 1994, 33, pp. 5733-5740.

Takeuchi, K.J.; Marschilok, A.C.; Davis, S.M.; Leising, R.A.; Takeuchi, E.S., "Silver vanadium oxides and related battery applications", Coord. Chem. Rev., 2001, 219, pp. 283-310.

Takeuchi, E.S.; Leising, R.A., "Lithium Batteries for Biomedical Applications", MRS Bull., 2002, 27, pp. 624-627.

Takeuchi, E.S.; Theibolt, W.C., "The Reduction of Silver Vanadium Oxide in Lithium/Silver Vanadium Oxide Cells", J. Electrochem. Soc., 1988,135, pp. 2691-2694.

Takeuchi, K.J.; Leising, R.A.; Palazzo, M.J.; Marschilok, A.C.; Takeuchi, E.S., "Advanced lithium batteries for implantable medical devices: mechanistic study of SVO cathode synthesis", J. Power Sources, 2003, 119, pp. 973-978.

Takeuchi, E.S.; Theibolt, W.C., "Lithium Diffusion in Silver Vanadium Oxide", J. Electrochem. Soc., 1988, v.135,abstract.

Theibolt, W.C.; Takeuchi, E.S., "The Step-Wise Reduction of Silver Vanadium Oxide in Lithium/Silver Vanadium Oxide Cells", J. Electrochem. Soc., 1987,v.134, abstract.

Zandbergen, H.W.; Crespi, A.M.; Skarstad, P.M.; Vente, J.F., "Two Structures of $Ag_{2-x}V_4O_{11}$, Determined by High Resolution Electron Microscopy", J. Solid State Chem., 1994, 110, pp. 167-175.

Schmidt, C.L.; Skarstad, P.M., "The future of lithium and lithium-ion batteries in implantable medical devices", J. Power Sources, 2001, 97-8, pp. 742-746.

Crespi, A.M.; Schmidt, C.L.; Norton, J.; Chen, K.; Skarstad, P.M., "Modeling and Characterization of the Resistance of Lithium/SVO Batteries for Implantable Cardioverter Defibrillators", J. Electrochem. Soc., 2001, 148, pp. A30-A37.

Sorensen, E.M.; Izumi, H.K.; Stern, C.L.; Poeppelmeier, K.R., "$Ag_4V_2O_6F_2$: An Electrochemically Active and High Silver Density Phase", J. Am. Chem. Soc., 2005, 127, pp. 6347-6352.

\* cited by examiner

SILVER VANADIUM OXIDE-FLUORIDE MATERIAL USEFUL AS A BATTERY CATHODE

This application claims the benefits and priority of provisional application Ser. No. 60/606,475 filed Sep. 1, 2004.

CONTRACTUAL ORIGIN OF THE INVENTION

This invention was made in part using funds obtained from the U.S. Government National Science Foundation (NSF) Grant/Contract No. DMR-0312136 and Office of Naval Research (ONR) Grant No. N00014-01-1-0810. The U.S. Government may therefore have certain rights in the invention.

FIELD OF THE INVENTION

The present invention relates to a metal oxide-fluoride material comprising silver, vanadium, oxygen and fluorine useful as a cathode for a battery and to a method of making the metal oxide-fluoride material and the cathode.

BACKGROUND OF THE INVENTION

The current standard cathode material in medical lithium batteries (e.g. a defibrillator battery) is silver vanadium oxide (SVO) material represented by atomic formula $Ag_2V_4O_{11}$. Although SVO material has a high theoretical capacity of 450 mAh/g (milliampere hour per gram), not all of this capacity is accessible at practical voltages. For example, the open circuit potential of SVO material versus lithium (anode) is 3.25 V. During discharge, the cathode inserts seven lithium ions until it reaches a cut-off voltage of 1.5 V, resulting in a total practical capacity of 315 mAh/g. Initially, the lithium reduces the $Ag_+$ to $Ag_0$ at around 3.25 V, which is the potential at which a defibrillator operates most efficiently. The lithium continues to react and reduces the $V^{5+}$ to $V^{4+}$ at 2.5 V. However, the potential does not plateau for the final reduction of $V^{4+}$ to $V^{3+}$ but instead it drops precipitously to the cut-off voltage. As a result of the low reduction potential, the full theoretical capacity of SVO is not utilized in practical applications since a voltage below 1.5 V is too low to supply the power (power equals current times voltage) needed for a defibrillator. The medical battery industry desires battery cathode materials that can maintain a potential above 3 V for extended periods of time so as to optimize defibrillator function.

SUMMARY OF THE INVENTION

The present invention provides in one embodiment a novel metal oxide-fluoride material comprising silver, vanadium, oxygen and fluorine and useful for, although not limited to, use as a cathode of a medical or other battery while providing capacity and open circuit potential advantages over silver vanadium oxide (SVO) material.

In a particular illustrative embodiment of the invention, the metal oxide-fluoride material comprises a compound represented by $Ag_4V_2O_6F_2$, which crystallizes in a monoclinic space group.

In another embodiment of the present invention, a cathode is provided comprising the metal oxide-fluoride material comprising silver, vanadium, oxygen and fluorine. The cathode can be used in a medical battery, such as a defibrillator battery, having a lithium anode.

In still another embodiment of the preset invention, a method is provided for making a metal oxide-fluoride material comprising silver, vanadium, oxygen, and fluorine by subjecting silver oxide, vanadium oxide, and an aqueous solution of HF to superambient temperature in a pressure vessel. In an illustrative embodiment of the invention, amounts of silver oxide, vanadium oxide, and aqueous solution of HF are disposed in a sealed container which is heated in an autoclave. For purposes of further illustration, amounts of $Ag_2O$, $V_2O_5$, and aqueous solution of HF in a sealed container can be subjected to superambient temperature in an autoclave to form a metal oxide-fluoride material represented by $Ag_4V_2O_6F_2$.

In a further embodiment of the present invention, a cathode is made by depositing a layer that comprises the metal oxide-fluoride material on an electrically conductive substrate. The layer can be deposited as a slurry that comprises the metal oxide-fluoride material, electrically conductive particulates, and a binder.

Advantages of the present invention will become more readily apparent from the following detailed description of the invention taken with the following drawings.

DESCRIPTION OF THE INVENTION

Figure 1:
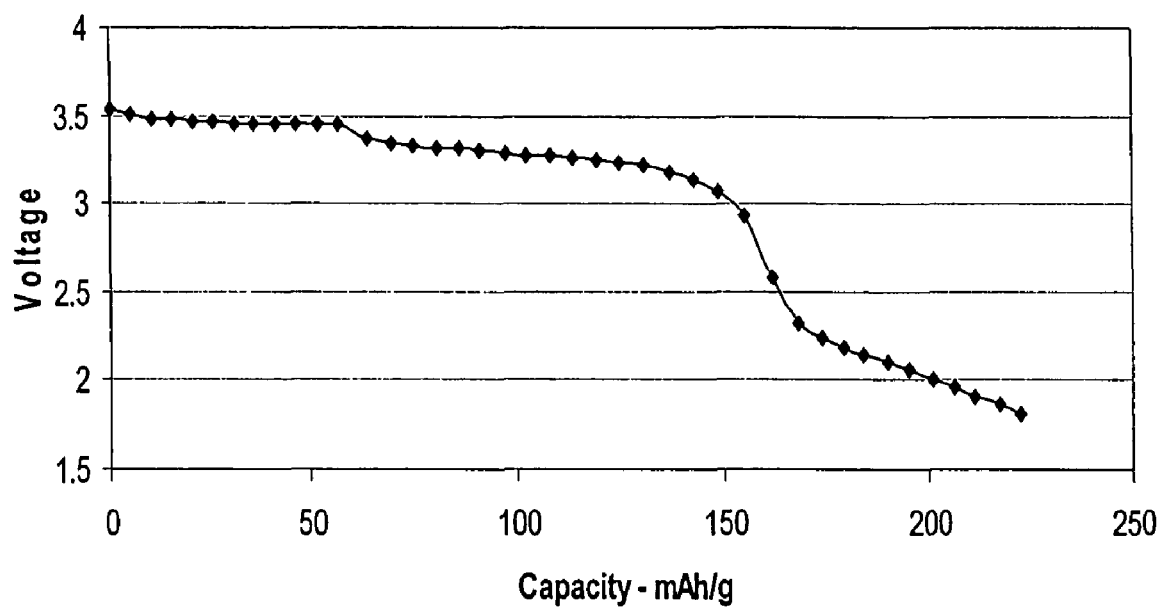
FIG. 1 is a graph of open circuit voltage and capacity expressed as milliampere hour per gram (mAh/g) of $Ag_4V_2O_6F_2$ cathode material.

The present invention provides a novel metal oxide-fluoride material that comprises silver, vanadium, oxygen and fluorine and provides advantages over SVO material by having increased capacity expressed as milliampere hour per gram of material (mAh/g) available from silver reduction at a potential above 3V as compared to that of SVO material, and a higher open circuit potential than that of SVO material versus lithium. Illustrative of such a metal oxide-fluoride material is a compound represented by the atomic formula $Ag_4V_2O_6F_2$. The invention is not limited to this particular stoichometric compound, however, since non-stoichiometric variants of this compound and other stoichiometric variants of this compound (i.e. other stoichiometric variants of the Ag—V—O—F material) are within the scope of the invention. For example, the amount(s) of silver, vanadium, oxygen and/or fluorine of the metal oxide-fluoride material can vary from the stoichiometric amount(s) of $Ag_4V_2O_6F_2$ so long as the variant material exhibits either increased capacity expressed as milliampere hour per gram of material (mAh/g) from silver reduction at a potential above 3V as compared to that of SVO material or a higher open circuit potential than that of SVO material versus lithium, or both.

For purposes of further illustration of the invention without limitation thereof, a high yield, low temperature synthesis process is described for making the metal oxide-fluoride compound represented by the atomic formula $Ag_4V_2O_6F_2$. Non-stoichiometric variants thereof and variants of other stoichiometries can be made in similar manner. In particular, starting materials include silver oxide in the form of $Ag_2O$ available in 99.99% by metals basis purity from Alfa Aesar, Ward Hill, Mass.; vanadium oxide in the form of $V_2O_5$ available in 99.99% metals basis purity from Sigma-Aldrich, St. Louis, Mo.; and commercially available aqueous hydrofluoric acid (49% by weight HF) from Fisher Scientific International, Hampton, N.H.

The starting materials in suitable proportions were placed in a Teflon (fluoro-ethylene-propylene) pouch as a container in air, and the pouch was heat sealed. In particular, 0.4639 grams ($2.002 \times 10^{-3}$ mole) of the $Ag_2O$, 0.0911 grams ($5.009 \times 10^{-4}$ mole) of the $V_2O_5$, and 0.3036 grams ($1.517 \times 10^{-2}$ mole) of the aqueous HF solution were placed in the Teflon pouch. Synthesis of $Ag_4V_2O_6F_2$ is not limited to these particluar molar amounts, but also includes Ag:V:HF molar ratios of 4:1, with 15-30 equivalents of HF, and 2:1, with 13-30 equivalents of HF, and molar amounts encompassed therein. The opening of the pouch then was heat sealed. The pouch was placed in a 125 mL Parr autoclave filled with 33% by volume deionized water as backfill with up to seven other similar pouches. The autoclave was heated for 24 hours at a superambient temperature of 150 degrees C. and then cooled to room (ambient) temperature over an additional 24 hour period. An autoclave temperature of about 100 degrees C. also can be used. The autoclave temperature thus preferably is in the range of about 100 to about 150 degrees C. The pouch was removed from the autoclave and opened in air, and the reaction products were recovered by vacuum filtration. Red needles of $Ag_4V_2O_6F_2$ were recovered in about a 95% yield based on the $V_2O_5$ component of the starting materials.

The recovered metal oxide-fluoride compound, $Ag_4V_2O_6F_2$, was characterized by single crystal X-ray diffraction data collected with Mo K$\alpha$ radiation ($\lambda$=0.71073 Angstroms) on a Bruker SMART-1000 CC diffractometer and integrated with a commercially available SAINT-Plus program. The crystal data for $Ag_4V_2O_6F_2$ revealed a monoclinic crystal structure, space group $P2_1/n$ (No. 14), with lattice parameters of a=8.4034(4), b=10.5481(1), and c=12.459(1), $\beta$=90.314(2)°, and Z=4 where $\beta$ is the angle between axes a and c and Z is formula unit number.

For purposes of illustration and not limitation, the $Ag_4V_2O_6F_2$ material was fabricated into a cathode for use in a battery having a lithium anode. In particular, a slurry was made and comprised 0.904 grams $Ag_4V_2O_6F_2$, 0.056 grams acetylene black particles and 0.056 grams of 50 micron diameter graphitic spheres available as MCM-50 from Osaka Gas, Osaka, Japan; and 12% by weight of polyvinylidene fluoride (PvDF) in NMP (1 methyl-2-pyrrolidinone) to create a slurry. Expressed in weight %, the cathode material included 80% by weight of $Ag_4V_2O_6F_2$, 10% by weight of electrically conductive carbon particles (acetylene black and graphitic particles), and 10% by weight polyvinylidene fluoride as a binder.

The slurry was cast as a layer of thickness of about 200 microns onto an aluminum foil current collector. The slurry was cured by heating to 90 degrees C. The resulting cathode/Al laminate was inserted into a 2032 Hohsen lithium button cell (battery) with Li metal serving as the anode with Celgard 2500 separator material available from Celgard, Inc, Charlotte, NC, between the cathode and the anode. The cell electrolyte was 1M $LiPF_6$ dissolved in 50% by volume ethylene carbonate and 50% by volume dimethyl carbonate.

FIG. 1 is a graph of open circuit voltage and capacity expressed as milliampere hour per gram (mAh/g) of the cell having the $Ag_4V_2O_6F_2$ cathode discharged over 10 days. The $Ag_4V_2O_6F_2$ cathode material has a higher open circuit potential of 3.52 V versus lithium as compared to 3.25 V for SVO material versus lithium. In addition, the $Ag_4V_2O_6F_2$ cathode material has an available maximum capacity of 160 mAh/g above 3.0 V. Remarkably, even with a relatively fast discharge measured over 10 days, the $Ag_4V_2O_6F_2$ cathode material maintains a high voltage above 3 V out to 150 mAh/g and achieves a capacity of 150 mAh/g as shown in FIG. 1. The high capacity is especially advantageous for medical batteries since this increased power charges and quickly recharges the capacitors of the defibrillator device when heart arrhythmia occurs.

The $Ag_4V_2O_6F_2$ cathode material has more accessible silver content for reduction above 3 V per gram of material as compared to SVO material and thus can provide about a 50% increase in capacity from silver reduction at a potential above 3V (the 3 V plateau) as compared to that of SVO material. For example, according to the formula of SOV material, $Ag_2V_4O_{11}$, the maximum capacity available from silver reduction is 90 mAh/g.

Figure 2:
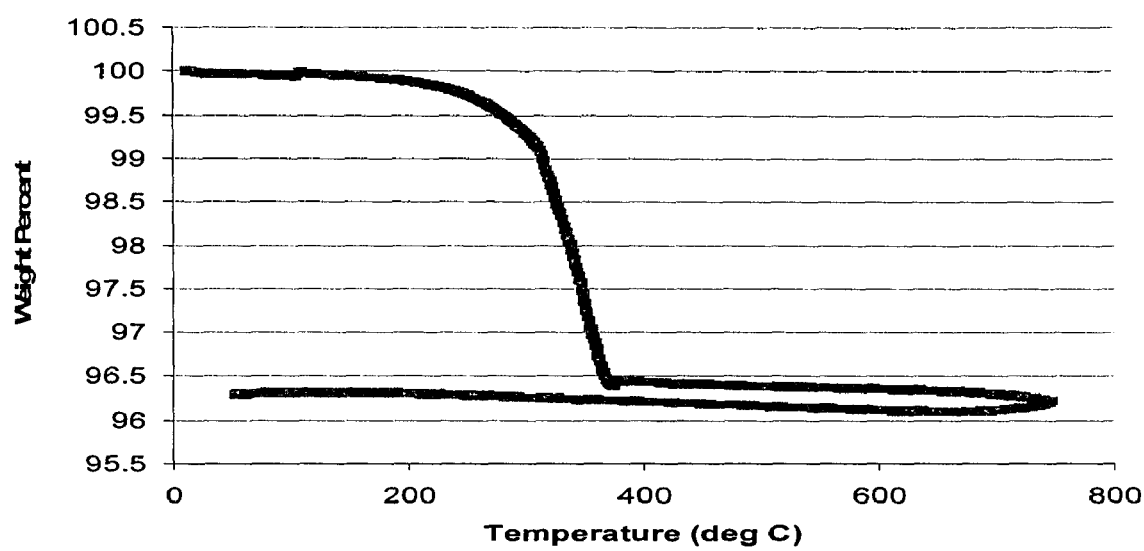
FIG. 2 is a thermogravimetric graph of weight change of $Ag_4V_2O_6F_2$ cathode material versus temperature in degrees C.

FIG. 2 is a thermogravimetric graph of weight % of $Ag_4V_2O_6F_2$ material versus temperature in degrees C. The weight of the $Ag_4V_2O_6F_2$ material does not change appreciably up to about 200 degrees C. This result indicates that the $Ag_4V_2O_6F_2$ material is stable up to about 200 degrees C., allowing the material to be fabricated into a cathode shape up to processing temperatures of 200 degrees C.

Although the invention has been described above with respect to certain embodiments, those skilled in the art will appreciate that the invention is not limited to these embodiments since modifications, changes, and the like can be made therein without departing form the spirit and scope of the invention as set forth in the appended claims.

We claim:

1. Metal oxide-fluoride material represented by $Ag_4V_2O_6F_2$.

2. The material of claim 1 which exhibits either increased capacity expressed as milliampere hour per gram of material at a potential of 3V as compared to that of silver vanadium oxide material or a higher open circuit potential than that of silver vanadium oxide material versus lithium, or both.

3. The material of claim 1 which crystallizes in a monoclinic space group.

4. A cathode comprising a metal oxide-fluoride material wherein the material is represented by $Ag_4V_2O_6F_2$.

5. A battery having an anode and a cathode wherein the cathode comprises a metal oxide-fluoride material wherein the material is represented by $Ag_4V_2O_6F_2$.

6. The battery of claim 5 wherein the cathode comprises a layer of said material.

7. The battery of claim 5 which is a medical defibrillator battery.

8. The battery of claim 5 having a lithium anode and having a maximum capacity of about 150 mAh/g and greater at a voltage of 3V.

9. A method of making a metal oxide-fluoride material, comprising subjecting silver oxide, vanadium oxide, and an aqueous solution of HF to superambient temperature in a pressure vessel.

10. The method of claim 9 wherein said silver oxide, said vanadium oxide, and said aqueous solution of HF are disposed in a container which is heated in the pressure vessel.

11. The method of claim 9 wherein amounts of $Ag_2O$, $V_2O_5$, and aqueous solution of HF are subjected to said superambient temperature to form the metal oxide-fluoride material represented by $Ag_4V_2O_6F_2$.

12. The method of claim 9 wherein the superambient temperature is about 100 to about 150 degrees C.

13. A method of making a cathode, comprising depositing a layer that comprises a metal oxide-fluoride material represented by $Ag_4V_2O_6F_2$ on an electrically conductive substrate.

14. The method of claim 13 wherein the layer is deposited as a slurry.

15. The method of claim 13 wherein the layer further includes electrically conductive particulates.

16. The cathode of claim 4 wherein the material comprises a reaction product of silver oxide, vanadium oxide, and hydrofluoric acid.

17. The battery of claim 5 wherein the material comprises a reaction product of silver oxide, vanadium oxide, and hydrofluoric acid.

* * * * *

UNITED STATES PATENT AND TRADEMARK OFFICE
CERTIFICATE OF CORRECTION

| | | |
|---|---|---|
| PATENT NO. | : 7,790,317 B1 | Page 1 of 1 |
| APPLICATION NO. | : 11/211135 | |
| DATED | : September 7, 2010 | |
| INVENTOR(S) | : Kenneth R. Poeppelmeier et al. | |

It is certified that error appears in the above-identified patent and that said Letters Patent is hereby corrected as shown below:

Column 1, lines 8-15 should read;
CONTRACTUAL ORIGIN OF THE INVENTION
This invention was made with government support under Grant No. DMR-0312136 awarded by the National Science Foundation and Grant No. N00014-01-1-0810 awarded by the Office of Naval Research. The government has certain rights in the invention.

Signed and Sealed this
Fourth Day of January, 2011

David J. Kappos
*Director of the United States Patent and Trademark Office*